United States Patent [19]

Ochiai et al.

[11] 3,787,645

[45] Jan. 22, 1974

[54] ECHO CANCELLER HAVING TWO ECHO PATH MODELS

[75] Inventors: Kazuo Ochiai; Takashi Araseki, both of Tokyo, Japan

[73] Assignee: Nippon Electric Company, Limited, Tokyo, Japan

[22] Filed: May 17, 1972

[21] Appl. No.: 254,071

[30] Foreign Application Priority Data

May 19, 1971 Japan ............................... 46/33858
Aug. 13, 1971 Japan ............................... 46/61736

[52] U.S. Cl. ............................................. 179/170.2
[51] Int. Cl. ............................................. H04b 3/20
[58] Field of Search ................................ 179/170.2

[56] References Cited

UNITED STATES PATENTS 3,499,999 3/1970 Sondhi ........................... 179/170.2
3,754,105 8/1973 Poschenrieder ................ 179/170.2

*Primary Examiner*—Kathleen H. Claffy
*Assistant Examiner*—Alan Faber
*Attorney, Agent, or Firm*—Ostrolenk, Faber, Gerb & Soffen

[57] ABSTRACT

An echo canceller having self-adaptive means retaining a first echo path model is comprised of means retaining a second echo path model, means for subtracting the output signal of the second echo path model means from the send-in signal to produce the send-out signal, means for comparing the first and the second echo path models, and means responsive to the results of comparison for transferring the echo path model from one of the first and the second echo path model means to the other.

6 Claims, 5 Drawing Figures

ECHO CANCELLER HAVING TWO ECHO PATH MODELS

BACKGROUND OF THE INVENTION

This invention relates to a kind of adaptive echo canceller, which is particularly useful for use at a junction between a four-wire and a two-wire line in a long-distance telephone network. In consideration of the use of an echo canceller, the four-wire line will be referred to herein as a communication line. Also, the signal incoming to the junction or the echo canceller from the communication line, the signal outgoing from the junction to the echo canceller, and the signal transmitted from the echo canceller to the communication line will be herinafter referred to as a receive-in signal, a send-in signal, and a send-out signal, respectively.

In parallel with the hybrid circuit or network at each junction between the four-wire and the two-wire lines, it is conventional to use an echo suppressor, such as referred to in U. S. Pat. No. 3,465,106 to Nagata et al, having means for detecting which of the receive-in signal incoming along a one-way path of the four-wire line to the junction and the send-in signal outgoing therefrom along the other one-way path is larger and means for either disconnecting the outgoing one-way path or interposing a large attenuation therein when the receive-in signal is significantly larger than the send-in signal. Because of the known defects of conventional echo suppressors, various echo suppressors of the cancellation type, or echo cancellers, are being substituted therefor. As taught in U. S. Pat. No. 3,465,106 cited above, an echo suppressor of this type has means containing an echo path model approximating the characteristics of the actual echo path for processing the receive-in signal to produce a synthesized echo signal and means for subtracting the synthesized signal from the send-in signal to produce the send-out signal which is transmitted through the outgoing one-way path to the remote end. In U. S. Pat. No. 3,499,999 to Sondhi, an adaptive echo cenceller is disclosed wherein the echo path model means is adaptively controlled in response both to the receive-in signal and cancellation error, or residue echo, so as to minimize the cancellation error. Echo cancellers, particularly those of the adaptive type, are preferred to the sophisticated echo suppressors because they in general will not unduly interrupt the speech signal transmitted from the two-wire line to the remote end through the junction and the outgoing one-way path. It should, however, be pointed out that the cancellation capability of conventional adaptive echo cancellers is adversely affected during double talk, when the send-in signal comprises the locally originating speech signal and the echo signal having leaked from the incoming one-way path to the outgoing path through the hybrid circuit.

According to U. S. Pat. No. 3,499,999 referred to above, an adaptive echo canceller comprises means for examining the relative levels of the receive-in and the send-in signals and for suspending the adaptive control whenever the receive-in level is less than about 3 db above the send-in level. In practice, it is often the case that the echo return loss, or the attenuation imposed by the actual echo path on the receive-in signal, is small so as not to sufficiently reduce the echo signal. It follows therefore with the Sondhi arrangement that a small attenuation loss results in a receive-in level less than about 3 db above the send-in level. This will undesiredly disturb the control on the echo path model despite the fact that it is in this case of large echoes that the echo cancellation is indispensable.

SUMMARY OF THE INVENTION

It is therefore an object of the present invention to provide an echo canceller capable of carrying out the best possible echo cancellation even in the presence of the double talk.

It is another object of this invention to provide an echo canceller having at least two echo path models wherein at least one of the echo path models is little disturbed even during the double talk.

It is still another object of this invention to provide an echo canceller a which the echo path models are always in good approximation of the characteristics of the actual echo path.

It is yet another object of this invention to provide an echo canceller in which the self-adaptive echo path model rapidly adapts itself to the characteristics of the actual echo path upon disappearance of the local speech signal.

According to this invention there is provided an echo canceller for cancelling the echo signal appearing from an actual echo path, comprising self-adaptive means retaining a first set of parameters approximating the characteristics of said echo path, wherein the improvement comprises first means retaining a second set of parameters approximating said characteristics, second means for comparing said first and said second set of parameters, and third means responsive to the results of comparison for substituting the set of parameters retained by one of said first and adaptive means and said first means for those retained by the other.

In the case of a junction between a four-wire and a two-wire line, the actual echo path is provided by the hybrid circuit interconnecting the two-wire line and the two one-way paths of the four-wire line.

According to one aspect of this invention there is provided an echo canceller to be interposed between an echo path and a communication line and having self-adaptive means retaining a first set of parameters approximating the characteristics of said echo path for modifying a receive-in signal incoming to said echo path from said communication line to produce a first synthesized signal, means for combining said first synthesized signal with a send-in signal outgoing from said echo path to said echo canceller to produce a combined signal, means for adjusting said first set of parameters in compliance with said receive-in signal and said combined signal so as to reduce the echo signal comprised in said combined signal, first means retaining a second set of parameters approximating the characteristics of said echo path for modifying said receive-in signal to produce a second synthesized signal, second means for combining said second synthesized signal with said send-in signal to produce a send-out signal transmitted to said communication line, third means for comparing said combined signal with said second send-out signal, and fourth means responsive to the results of comparison for substituting the parameters retained by said self-adaptive means for those retained by said first means.

As will be seen from the above, an echo canceller according to this invention is characterised by at least two echo path models. Among the models, the first echo path model is self-adaptive to become a better approximation of a given echo path. The second echo path model is not self adaptive. The output signals derived by these echo path models are combined with the send-in signal to produce the combined and the send-out signals, respectively. The short-time averages of the combined and the send-out signals provide the criteria for the first and the second echo path models, respectively, as regards the degree of approximation of the actual echo path achieved by such models. When the first echo path model gives a better approximation than the second echo path model, the parameters retained by the self-adaptive echo path model means are substituted for those retained by the other echo path model means.

In accordance with the above-mentioned one aspect of this invention, it is when the send-out signal is of significant magnitude in terms of the combined signal that the second echo path model is rewritten in compliance with the first echo path model. The second echo path model thus provides a better approximation of the actual echo path. It should, however, be pointed out that the first echo path model undergoes a considerable change during double talk and takes time to restore the proper approximation of the actual echo path upon disappearance of the outgoing speech signal. In contrast, the second echo path model provides a better approximation than the first. It might therefore be desirable to rewrite the first echo path model with reference to the second echo path model when the latter is significantly better than the former. Furthermore, it should be noted with the above-mentioned one aspect of this invention that the comparison of the echo path models would accompany an error which would make the second echo path model grow worse as the first echo path model undergoes a considerable change, although the probability is very small. As a safeguard, it might also be desirable to rewrite one of the echo path models in compliance with a significantly better one of the echo path models.

During the occurence of double talk, the first echo path model is disturbed by the local speech signal contained in the send-in signal and hence in the combined signal. This gives rise to insufficient echo cancellation and, in some cases, to amplification of the echo signal. On the other hand, the second echo path model is not adversely affected by the speech signal because of its lack of self-adaptability. This keeps the send-out signal in the desirable state. In case the short-time average of the send-out signal has a lower level than that of the combined signal, it is desirable that the second echo path model be kept unchanged. When variation occurs in the characteristics of the actual echo path, the first echo path model is furnished with a better approximation by its self-adaptability to result in a combined signal whose short-time average of the levels is now lower than that of the send-out signal. It is now necessary that the first echo path model be transferred to the second echo path model means. This transfer of the echo path model continues until there is no significant difference between the short-time averages. In an aspect of this invention preferred so long as the performance is concerned, means is further provided for transferring the second echo path model back to the first echo path model means when the short-time average of the combined signal becomes significantly larger than that of the send-out signal.

DETAILED DESCRIPTION OF THE PREFERRED EMBODIMENTS

Figure 1:
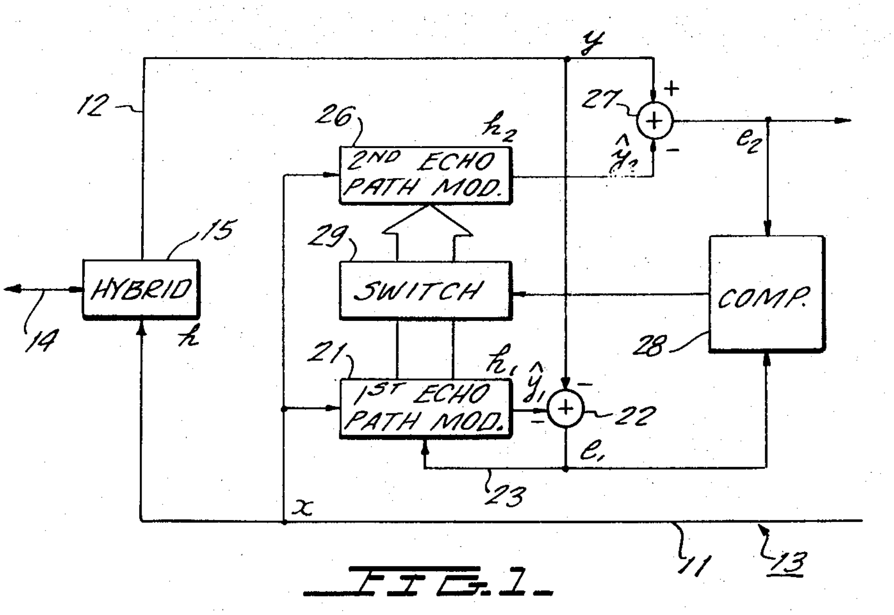
FIG. 1 is a block diagram of a first embodiment of the instant invention.

Referring to FIG. 1, a first embodiment of the instant invention bridges an incoming and an outgoing one-way path 11 and 12 of a four-wire line 13 connected to a two-wire line 14 through a hybrid circuit 15, which delivers in practice a fraction of the incoming signal to the outgoing path 12 as the echo signal. The actual echo path thus provided has a transfer function $h$ which is subject to variation. The echo canceller comprises, as is known in the art, an echo path model unit 21 connected to the incoming path 11 for modifying or processing the receive-in signal $x$ in conformity with a first echo path model or a first set of parameters $h_1$ contained therein to produce a first synthesized echo signal $\hat{y}_1$, a first combining circuit 22 for combining the synthesized signal with the send-in signal $y$ to produce a first combined signal $e_1$, and means symbolically depicted by a connection 23 for adjusting the first set of parameters in compliance with the receive-in signal and the combined signal so as to reduce the echo signal appearing in the combined signal. The embodiment comprises another echo path model unit 26 connected to the incoming one-way path 11 for modifying the receive-in signal in conformity with a second echo path model or a second set of parameters $h_2$ contained therein to produce a second synthesized echo signal $\hat{y}_2$, a second combining circuit 27 interposed in the outgoing one-way path 12 for combining the second synthesized signal with the send-in signal to produce a second combined signal $e_2$ which is delivered through the outgoing path 12 to the remote end as the send-out signal, an echo path model comparing circuit 28 supplied with the first and the second combined signals for producing a command signal when the short-time average of the former is significantly smaller than that of the latter, and a switching circuit or gate circuit 29 responsive to the command signal for substituting the contents of the first echo path model unit 21 for the contents of the second echo path model unit 26. The parameters $h_1$ and $h_2$ stored in the first and the second echo path model units 21 and 26 are approximations of the characteristics of the actual echo path.

Figure 2:
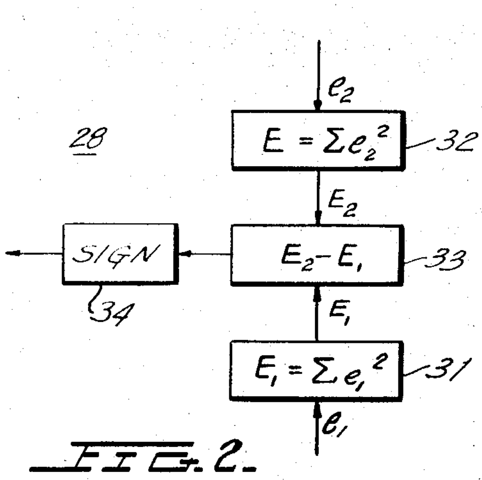
FIG. 2 is a block diagram of an example of the echo path model comparing means used in the embodiment shown in FIG. 1.

Referring to FIG. 2, an example of the echo path model comparing circuit 28 comprises a first square sum computer 31 supplied with the first combined signal $e_1$ for producing a first sum signal $E_1$ representative of the sum of the squares of the signals supplied during a short predetermined time, a second square sum computer 32 supplied with the second combined signal $e_2$ for producing a second sum signal $E_2$ representative of a similar sum, a subtracting circuit 33 supplied with the first and the second sum signals $E_1$ and $E_2$ for producing a difference signal given by subtracting the former $E_1$ from the latter $E_2$, and a sign discriminator 34 responsive to the difference signal for producing the command signal when the difference $E_2 - E_1$ is positive. Instead of the square sum computers 31 and 32, the comparing circuit 28 may comprise, for each of the first and the second combined signals, a rectifier for rectifying the combined signal supplied thereto to derive the absolute value of the combined signal amplitude and an integrator supplied with the rectified output for integrating the absolute value of the combined signal for a short predetermined time. Preferably, the subtracting circuit 33 and/or the sign discriminating circuit 34 is provided with means for producing the command signal when the short-time average of the second combined signal is significantly greater than that of the first combined signal.

Figure 3:
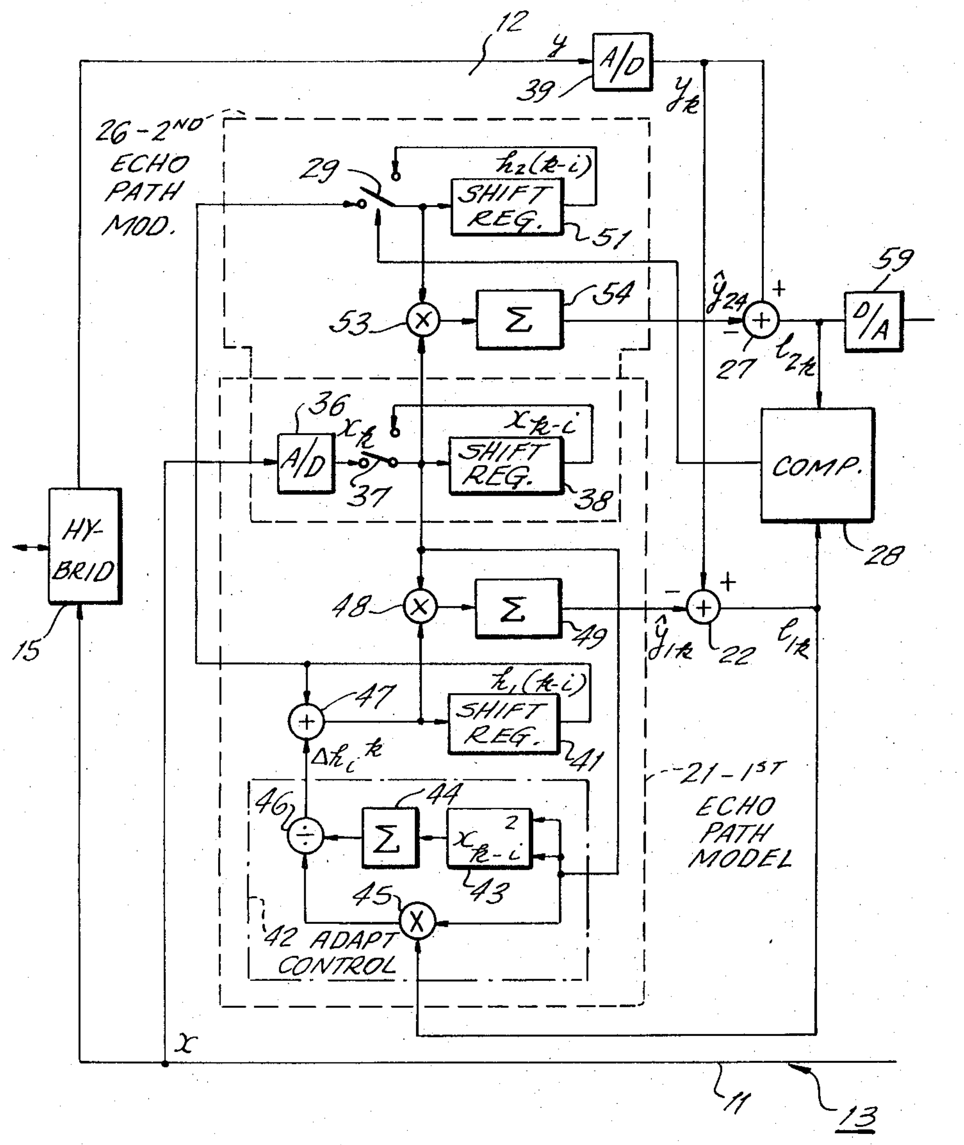
FIG. 3 is a block diagram of a first practical example of the first embodiment.

Referring to FIG. 3, a practical example of the first embodiment illustrated above makes use of the echo path models representing the characteristics of the actual echo path on the time domain basis in the usual way as is the case with U. S. Pat. No. 3,499,999 cited above. More particularly, the contents of the echo path model unit 21 or 26 may be given by the output signals of the integrating networks 32 described in U. S. Pat. No. 3,499,999 or by the output signals of the tap gain registers 320–329 disclosed in U. S. Pat. Application Ser. No. 877,887, filed Nov. 19, 1969, by Chiba et al, now U.S. Pat. No. 3,660,619. In the example depicted in FIG. 3, the first echo path model unit 21 comprises a receive-in signal analog-to-digital converter 36 supplied with the receive-in signal $x$ for successively deriving digital receive-in signal samples $x_k$, a switching circuit symbolically shown by a switch 37 supplied with the receive-in signal samples at one of two interswitchable contacts, and a receive-in signal shift register 38 whose input and output terminals are connected to the fixed contact and to the other of the interswitchable contacts of the switch 37 so as to retain a predetermined number $n$ of the supplied receive-in signal samples so long as the input and the output terminals are shorted by the switch 37 and to substitute a new sample $x_k$ for the oldest sample $x_{k-n}$ when the switch 37 is interswitched at the sampling time $k$ as expressed in terms of the sampling period. It may be mentioned here that the outgoing one-way path 12 includes a send-in signal analog-to-digital converter 39 prior to the combining circuits 22 and 27 for successively deriving digital send-in signal samples in timed relation to the receive-in signal samples so that the first and the second combined signals $e_1$ and $e_2$ are also given as sampled signals. The first echo path model unit 21 further comprises a first parameter shift register 41 for storing the predetermined number $n$ of the first set of parameters $h_1$ and an adaptive control unit 42 responsive to the receive-in signal samples and the first combined signal samples for self-adaptively adjusting the contents of the first parameter register 41. A specific example of the unit 42 illustrated in FIG. 3 carries out the adjustment according to the algorithm referred to in "IEEE Trans. on Automatic Control," Vol. AC-13, No. 3 (June, 1967), page 282, by Nagumo et al and comprises a square calculator 43 responsive to the successive receive-in signal samples $x_{k-i}$ $(i = 0, 1, ..., N\text{-}1)$ for calculating the squares, a summing circuit 44 for summing up the squares, a multiplier 45 supplied with the successive receive-in signal samples and the first combined signal sample $e_{ik}$ at the sampling point $k$ for deriving the products, and a divider 46 for dividing the products by the summation for deriving a series of the amounts of adjustment $\Delta h_i^k$ given by $$\Delta h_i^k = x_{k-i} \cdot e_k \Big/ \left( \sum_{i=0}^{N-1} x_{k-i}^2 \right),$$

which are successively added at an adder circuit 47 to the circulating corresponding contents of the first parameter register 41. The first echo path model unit 21 still further comprises a first multiplier 48 responsive to the successive receive-in signal samples and the successive sums derived from the adder circuit 47 for calculating the products and a summing circuit 49 for summing up the products to derive the convolution of the receive-in signal $x_k$ and the first set of parameters $h_{ik}$. The signal derived by the convolution is delivered to the first combining circuit 22 as the first synthesized echo signal $\hat{y}_{ik}$ for the send-in signal sample $y_k$ of the sampling time $k$. The second echo path model unit 26 comprises the receive-in signal analog-to-digital converter 36, the switching circuit 37, and the receive-in signal shift register 38 and is accompanied by the switching circuit 29 shown within the second echo path model unit 26 for the convenience of illustration and symbolically by a switch controlled by the command signal and having one of its two interswitchable contacts connected to the output terminal of the first parameter shift register 41. The second echo path model unit 26 further comprises a second parameter shift register 51 whose input and output terminals are connected to the fixed contact and to the other of the interswitchable contacts of the switch 29 to be supplied with the first set of parameters $h_1$ whenever the command signal appears and to store thus supplied second set of parameters $h_2$ for circulation while no command signal appears. The second echo path model unit 26 still further comprises a second multiplier 53 responsive to the circulating receive-in signal samples $x_{k-i}$ and the similarly circulating second set of parameters $h_{2(k-i)}$ for successively producing the products and a summing circuit 54 for summing up the products to deliver the convolution of the receive-in signal $x_k$ and the second set of parameters $h_{2k}$ to the second combining circuit 27 as the second synthesized echo signal $\hat{y}_{2k}$ at the sampling time $k$. In the example being illustrated, the second combined signal is supplied to a digital-to-analog converter 59, which delivers the substantially echo free send-out signal to the remote end through the outgoing path 12. The sampling frequency may be 8 kHz and the predetermined number $n$ may be about 250.

Figure 4:
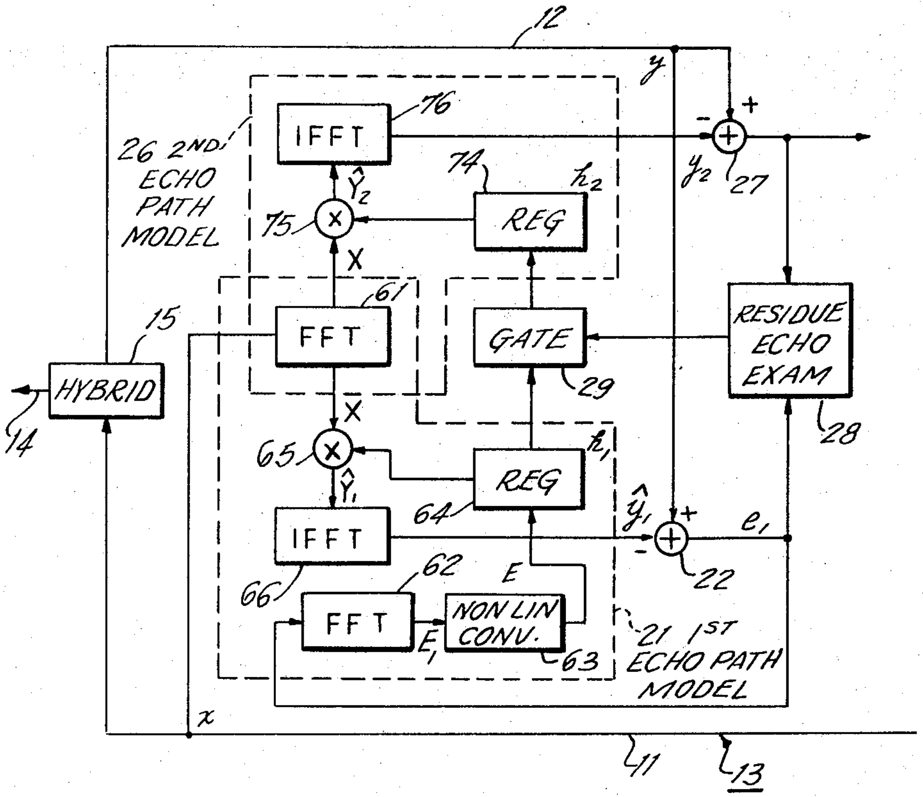
FIG. 4 is a block diagram of a second practical example of the first embodiment.

Referring to FIG. 4, another example of the first embodiment employs means for representing the characteristics of the actual echo path on the frequency domain basis. The first and the second echo path model units 21 and 26 comprise in common a receive-in signal Fourier transform calculator 61 supplied with a predetermined number of receive-in signal samples $x$ for carrying out the fast Fourier transformation thereon to derive the Fourier transform X of the receive-in signal samples. The first echo path model unit 21 further comprises a first Fourier transform calculator 62 for effecting the fast Fourier transformation on a like number of first combined signal samples $e_1$ to produce the Fourier transform $E_1$ thereof, a nonlinear converter 63 for modifying the Fourier transform $E_1$ in a manner later described to produce a modified Fourier transform E of the first combined signal samples, a first register 64 for storing the modified Fourier transform as the first set of parameters $h_1$, or the first approximation of the frequency characteristics of the actual echo path, a first multiplier 65 for producing the product of the Fourier transform X of the receive-in signal samples and the first set of parameters $h_1$ to derive the Fourier transform $\hat{Y}_1$ of the first synthesized echo signal samples $\hat{y}_1$, and a first inverse Fourier transform calculator 66 for delivering the inverse Fourier transform of the output signal of the first multiplier 65 to the first combining circuit 22 as the first synthesized echo signal. The nonlinear conversion is so effected as to make the first combined signal converge to zero in the absence of the double talk. The second echo path model unit 26 comprises a second register 74 for storing as the second set of parameters $h_2$ the contents of the first register 64 supplied thereto through the switching circuit 29 every time the command signal appears, a second multiplier 75 for producing the product of the Fourier transform X of the receive-in signal samples and the second set of parameters $h_2$ to derive the Fourier transform $\hat{Y}_2$ of the second synthesized echo signal $\hat{y}_2$, and a second inverse Fourier transform calculator 76 for delivering the inverse Fourier transform of the output signal of the second multiplier 75 to the second combining circuit 27 as the second synthesized echo signal $\hat{y}_2$.

Figure 5:
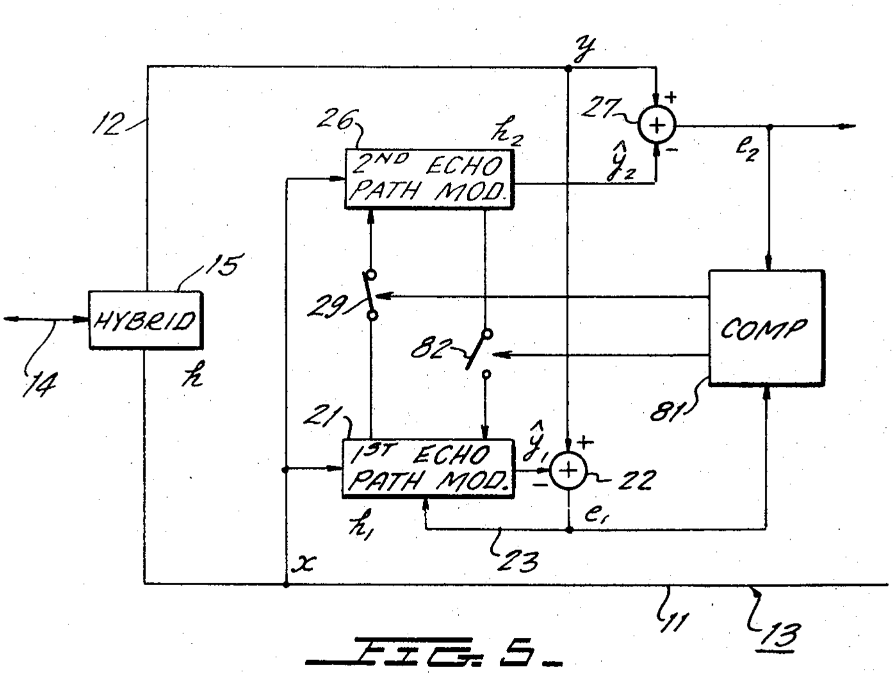
FIG. 5 is a block diagram of a second embodiment of this invention.

Referring to FIG. 5, a second embodiment of the present invention bridges the incoming and the outgoing one-way paths 11 and 12 of a four-wire line 13 connected to the two-wire line 14 through the hybrid circuit 15. The echo canceller comprises an echo path model unit 21 connected to the incoming path 11 for modifying the receive-in signal x in conformity with a first echo path model $h_1$ contained therein to produce a first synthesized echo signal $\hat{y}_1$, a first combining circuit 22 for combining the synthesized signal with the send-in signal $y$ to produce a first combined signal $e_1$, and means symbolically depicted by a connection 23 for adjusting the first echo path model in compliance with the receive-in signal and the combined signal so as to reduce the echo signal appearing in the combined signal. The second embodiment comprises another echo path model unit 26 connected to the incoming path 11 for modifying the receive-in signal in conformity with a second echo path model $h_2$ contained therein to produce a second synthesized echo signal $\hat{y}_2$, a second combining circuit 27 interposed in the outgoing path 12 for combining the second synthesized signal with the send-in signal to produce a second combined signal $e_2$, or the send-out signal, an echo path model comparing circuit 81 supplied with the first and the second combined signals for producing a first and a second command signal when the short-time average of the former is significantly smaller than that of the latter and when a similar average of the former is significantly greater than the latter, respectively, and a pair of switching circuits or gate circuits 29 and 82 responsive to the respective command signals for rewriting the second echo path model in compliance with the first echo path model and the first echo path model in compliance with the second echo path model, respectively. As was the case with the first embodiment, the echo path models $h_1$ and $h_2$ give approximation of the characteristics of the actual echo path. With this second embodiment of the present invention, it will now be appreciated that the first combined signal may equally well be used as the send-out signal instead of the second combined signal.

While a limited number of particular embodiments of the instant invention and some practical examples thereof have been described above, it should be understood that various other echo path models are applicable to the first and the second echo path models, such as the models revealed in U. S. Pat. No. 3,500,000 to Kelly, Jr. et al or the rational function model in which the actual echo path transfer function is simulated by a suitable number of poles and zeros.

What is claimed is:

1. An echo canceller for cancelling the echo signal appearing from an actual echo path, comprising self-adaptive means retaining a first set of parameters approximating the characteristics of said echo path, wherein the improvement comprises first means retaining a second set of parameters approximating said characteristics, second means for comparing said first and said second sets of parameters, and third means responsive to the results of comparison for substituting the parameters retained by one of said self-adaptive means and said first means for those retained by the other.

2. An echo canceller according to claim 1, wherein said second means produces a command signal when said first set of parameters gives significantly better approximation of said characteristics than said second set of parameters and said third means substitutes the parameters retained by said self-adaptive means for those retained by said first means in response to said command signal.

3. An echo canceller according to claim 1, wherein said second means produces a first command signal when said first set of parameters gives significantly better approximation of said characteristics than said second set of parameters and a second command signal when said second set of parameters gives significantly better approximation of said characteristics than said first set of parameters and said third means responsive to said first command signal substitutes the parameters retained by said self-adaptive means for those retained by said first means and responsive to said second command signal substitutes the parameters retained by said first means for those retained by said self-adaptive means.

4. An echo canceller to be interposed between an echo path and a communication line and having self-adaptive means retaining a first set of parameters approximating the characteristics of said echo path for modifying a receive-in signal incoming to said echo path from said communication line to produce a first synthesized signal, means for combining said first synthesized signal with a send-in signal outgoing from said echo path to said echo canceller to produce a combined signal, means for adjusting said first set of parameters in compliance with said receive-in signal and said combined signal so as to reduce the echo signal comprised in said combined signal, first means retaining a second set of parameters approximating the characteristics of said echo path for modifying said receive-in signal to produce a second synthesized signal, second means for combining said second synthesized signal with said send-in signal to produce a send-out signal transmitted to said communication line, third means for comparing said combined signal with said send-out signal, and fourth means responsive to the results of comparison for substituting the parameters retained by said self-adaptive means for those retained by said first means.

5. An echo canceller according to claim 4, wherein said third means compares said combined signal with said send-out signal for a predetermined time to derive the results of the comparison to produce a command signal when said combined signal is significantly smaller than said send-out signal and said fourth means comprises switching means responsive to said command signal for supplying the parameters retained by said self-adaptive means to said first means as the parameters retained by the latter.

6. An echo canceller according to claim 5, further comprising fifth means for comparing the approximation given by said first echo path model parameters with that given by said second echo path model parameters to derive the results of the comparison as a further command signal while the latter is significantly smaller than the former and sixth means responsive to the presence of said further command signal for replacing said second set of echo path model parameters to said self-adaptive means as said first set of echo path model parameters.

* * * * *